Jan. 1, 1924 1,479,253
G. RIVETTA
MOTION PICTURE CAMERA TAKE-UP REEL MECHANISM
Filed Feb. 17, 1923
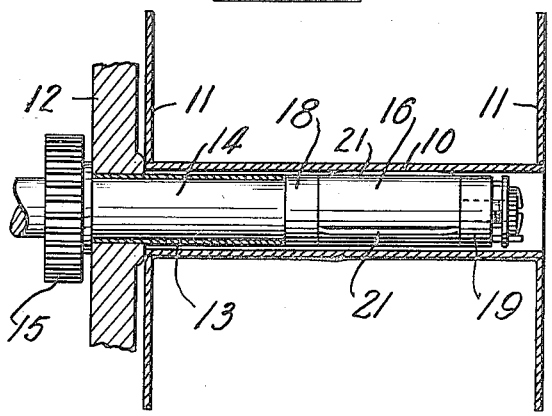
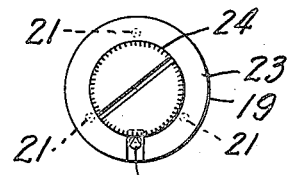
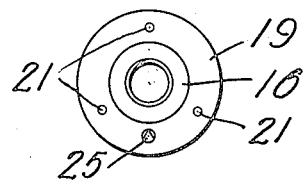
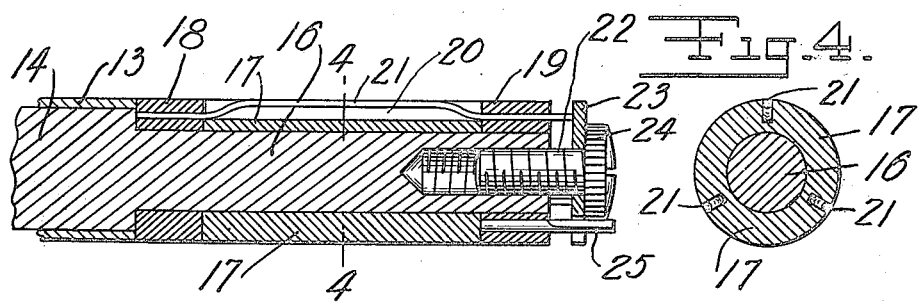
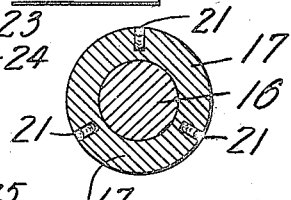
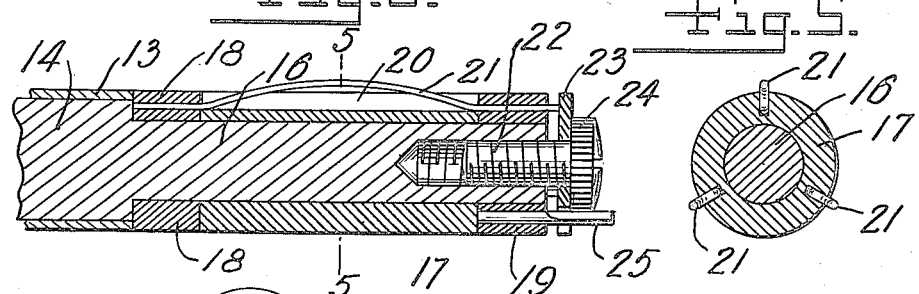
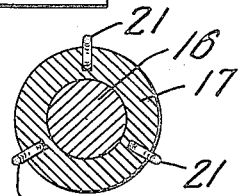
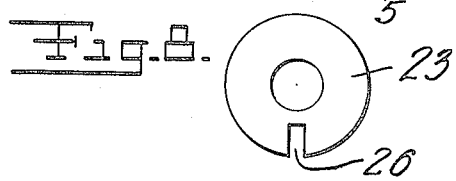

Patented Jan. 1, 1924.

1,479,253

UNITED STATES PATENT OFFICE.

GIOVANNI RIVETTA, OF PARIS, FRANCE, ASSIGNOR TO SEPT CINEMA CAMERA DISTRIBUTORS, INC., OF NEW YORK, N. Y., A CORPORATION OF NEW YORK.

MOTION-PICTURE-CAMERA TAKE-UP-REEL MECHANISM.

Application filed February 17, 1923. Serial No. 619,542.

*To all whom it may concern:*

Be it known that I, GIOVANNI RIVETTA, a subject of the King of Italy, and residing at Avenue Klaber 86, Paris, France, have invented certain new and useful Improvements in Motion-Picture-Camera Take-Up-Reel Mechanism, of which the following is a specification.

My present invention relates to friction take-up devices for motion picture cameras, and will be best understood from the following description and the annexed drawing, in which Fig. 1 is a side elevation, partly in section and on an enlarged scale, of one embodiment of my invention; Fig. 2 is an enlarged longitudinal section of a part of Fig. 1; Fig. 3 is the same as Fig. 2, but with the parts in different adjustment; Fig. 4 is a section on the line 4—4 of Fig. 2; Fig. 5 is a section on the line 5—5 of Fig. 3; Fig. 6 is an enlarged end view of a part of Fig. 1; Fig. 7 is the same as Fig. 6 with some of the parts removed, and Fig. 8 is a detail.

Like reference characters indicate like parts in the different views.

In the drawings, a part of a motion picture reel is shown in Fig. 1, having a hub 10 with a cylindrical bore and flanges 11, 11, such reel being of a known construction. A part of a motion picture frame 12 carries a bearing tube 13 through which extends a spindle having a bearing portion 14 and being driven by a gear 15. The outer end or portion 16 of the spindle at the right of Fig. 1 is provided with a sleeve 17 and a pair of collars 18, 19, the sleeve 17 and the two collars 18 and 19 being provided for structural purposes only and being rigidly attached to the portion 16 to form a continuous part of the spindle.

The sleeve 17 is provided in the illustrative embodiment with three slots 20, in each of which is located a spring wire 21 having its inner end passing through a hole in the collar 18 and abutting against a shoulder on the spindle and its outer end passing through a hole in the collar 19, this end projecting normally for a short distance beyond the outer edge of the collar 19. A screw 22 is threaded into the end of the spindle and is provided with a washer 23 which bears against the ends of the spring wire 21, as shown best in Fig. 2. In the illustrative embodiment, the head of the screw 22 is knurled, as at 24, this knurling being engaged by a pin 25 fixed in the collar 19 and being sufficiently elastic to act as a spring detent to engage the knurling 24 to hold the screw 22 in adjusted position. The washer 23 is provided with a slot 26 for the pin 25.

Contact between the springs 21 and the wall of the bore of the hub 10 constitutes a friction device to transmit motion from the take-up spindle to the take-up reel, which degree of friction may be adjusted to bring about the proper tension on the film being wound on the reel, according to the amount of wear in the friction device. As shown in Fig. 2, the wires 21 are substantially at the surface of the sleeve 17 and in that position would exert no pressure on the hub 10. By screwing down the screw 22, however, the washer 23 is pressed against the ends of the spring wires 21 to force the center thereof outward, as shown in Figs. 3 and 5, to press against the inner wall of the hub 10. Obviously the distance to which the screw 22 is moved to the left of Fig. 2 will determine the degree of friction to act to draw the reel from the spindle.

While it would be possible to drive the reel by means of a single wire 21, I prefer to provide a plurality of such wires spaced substantially evenly around the axis of the spindle, so that the reel is centered on the spindle automatically and the friction applied at several points around the axis of the spindle to produce greater uniformity in the drive.

While in the foregoing description and in the appended claims, I have described the member 21 as a wire, it will be understood that by this term, I mean any flexible member which can be moved outwardly in the manner described by pressing on its end, though for the small mechanism to which my arrangement is particularly adapted, a small piece of piano wire or the like is an effective friction device.

I claim:

1. In a motion picture camera, a take-up reel having a cylindrical axial bore, a driven spindle supported at one end and extending through the bore, and having a slot parallel to its axis, a flexible wire in said slot having one end extending beyond the end of the spindle and its other end abutting against a part of the spindle, and means, carried by the spindle and arranged to press against the end of the wire to spring its central portion outward into contact with the take-up reel.

2. In a motion picture camera, a take-up reel having a cylindrical axial bore, a driven spindle supported at one end and extending through the bore and having a slot parallel to its axis, a flexible wire in said slot having one end extending beyond the end of the spindle and its other end abutting against a part of the spindle, and a plate carried by the spindle and extending over the end of the wire and a screw to press the plate against the end of the wire to spring its central portion outward into contact with the take-up reel.

3. In a motion picture camera, a take-up reel having a cylindrical axial bore, a driven spindle supported at one end and extending through the bore and having a plurality of slots parallel to its axis and spaced substantially evenly around the spindle, a wire in each slot having one end projecting beyond the end of the spindle and its other end abutting against a part of the spindle, and means carried by the spindle and arranged to press against the ends of the wires to spring their central portions outward into contact with the take-up reel.

4. In a motion picture camera, a take-up reel having a cylindrical axial bore, a driven spindle supported at one end and extending through the bore and having a plurality of slots parallel to its axis and spaced substantially evenly around the spindle, a wire in each slot having one end projecting beyond the end of the spindle and its other end abutting against a part of the spindle, a plate carried by the spindle and extending over the ends of the wires, and a screw to press the plate against the ends of the wires to spring their centers outward into contact with the take-up reel.

GIOVANNI RIVETTA.